United States Patent [19]

Musso

[11] Patent Number: 5,720,585
[45] Date of Patent: Feb. 24, 1998

[54] METHOD OF FORMING GROOVES WITH CUTTING EDGES IN THE SIDES OF THE TEETH OF A SHAVING CUTTER

[75] Inventor: Pier Giulio Musso, Torino, Italy

[73] Assignee: U.S.P.I.T. S.p.A., Torino, Italy

[21] Appl. No.: 567,045

[22] Filed: Dec. 4, 1995

[51] Int. Cl.$^6$ ................................................. B23D 3/00
[52] U.S. Cl. ................................................. 409/293; 409/63
[58] Field of Search .................................. 409/244, 259, 409/262, 37, 46, 293, 288, 63

[56] References Cited

U.S. PATENT DOCUMENTS

| 1,700,683 | 1/1929 | Madsen | 144/5 |
| 2,405,159 | 8/1946 | Miller | 409/46 |
| 3,103,675 | 9/1963 | Vaughn | 409/244 X |
| 3,259,019 | 7/1966 | Bibrens | 409/268 X |

FOREIGN PATENT DOCUMENTS

| 1143534 | 3/1985 | U.S.S.R. |
| 0392385 | 4/1933 | United Kingdom |
| WO8607551 | 12/1986 | WIPO |

*Primary Examiner*—William R. Briggs
*Attorney, Agent, or Firm*—Sughrue, Mion, Zinn, Macpeak & Seas, PLLC

[57] ABSTRACT

A method of forming grooves with cutting edges in the sides of the teeth of a shaving cutter comprises, in order:

- a first machining step with the removal of shavings, in the course of which a plurality of grooves is formed, each groove having two side walls substantially perpendicular to a plane tangential to the respective side of the tooth, and
- a second machining step with the removal of shavings, in the course of which the side walls of each groove are machined to produce a cutting edge with an acute cutting angle.

2 Claims, 3 Drawing Sheets

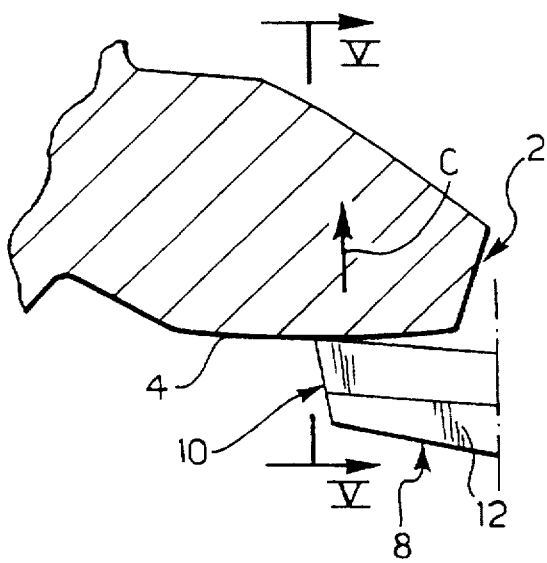
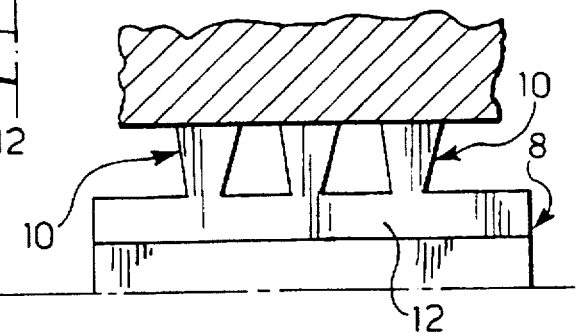
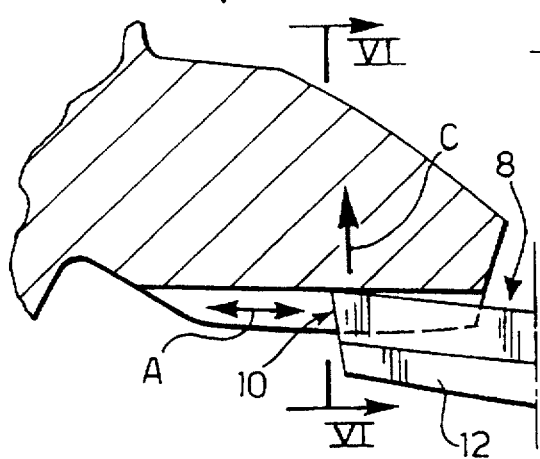
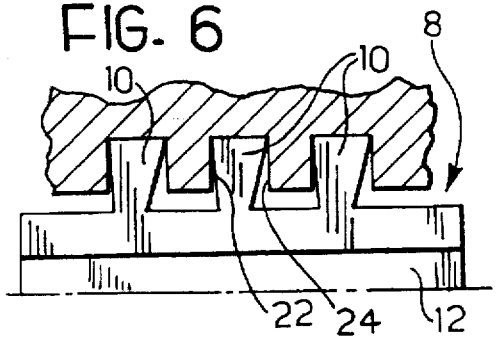
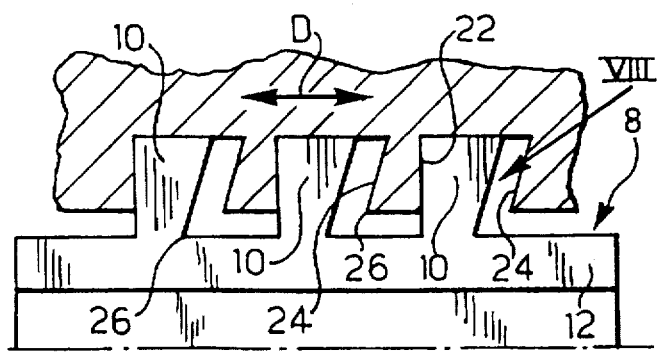
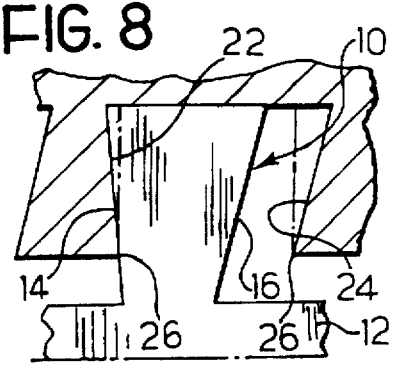

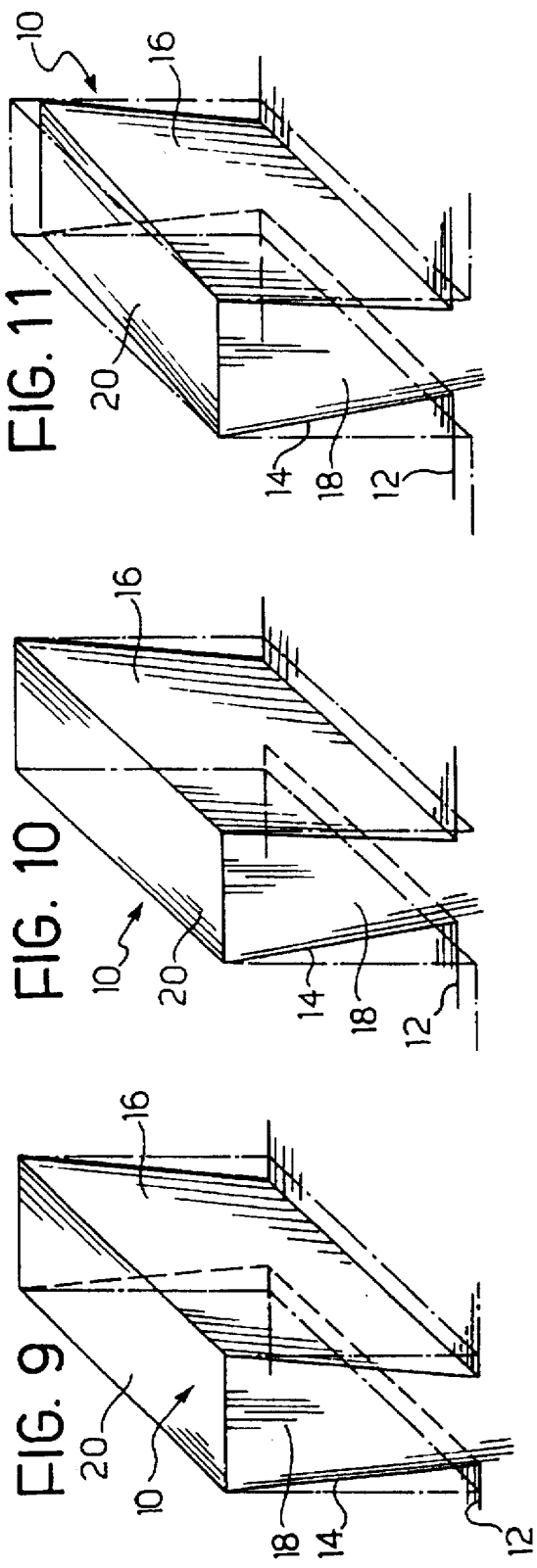

METHOD OF FORMING GROOVES WITH CUTTING EDGES IN THE SIDES OF THE TEETH OF A SHAVING CUTTER

DESCRIPTION

BACKGROUND

The present invention relates to the manufacture of shaving cutters for the finishing of gears. As is known, a shaving cutter is constituted essentially by a toothed disc with straight or helical teeth with involute profiles in which a plurality of grooves is formed in the sides of the teeth, the edges of the grooves constituting the cutting edges which carry out the shaving of the sides of the gear teeth.

Conventional shaving cutters have grooves with rectangular profiles which are produced by slotting carried out by means of a tool having a plurality of cutting elements with rectangular profiles. In slotting, the cutting elements are given a cutting motion directed parallel to a plane tangential to the side of the tooth and an advancing motion perpendicular to that plane. This technique, which is now well established, produces cutting edges with cutting angles of about 90° on the sides of the teeth.

Shavers with helical teeth are also known in which the side walls of the grooves are parallel to the faces of the shaver and each groove consequently has a cutting edge with a positive rake (an acute cutting angle) and a cutting edge with a negative rake (an obtuse cutting angle). During machining, shaving cutters of this type have a single cutting edge with a positive rake in each sense of rotation and therefore have to be used with reversal of the rotation during machining.

Soviet patent No. 1143534 proposes the formation of grooves with undercut profiles on the sides of the teeth of a shaving cutter, so as to give rise to a cutting edge with an acute angle in order to improve the quality of the shaving with less contact force between the shaver and the gear. In the solution proposed by the aforementioned Soviet patent, the grooves of the shaver are formed by electrical discharge machining carried out with a cylindrical electrode having a diameter equal to the maximum width of the groove.

The main disadvantage of the solution proposed by the aforementioned Soviet patent consists of its high cost and the long machining times involved with electrical discharge machining. Moreover, in the case of helical teeth, this machining technique involves considerable complications relating to the shape to be given to the electrode in order to produce grooves of uniform depth throughout the axial width of the tooth without overrunning the sides of the grooves previously formed.

SUMMARY OF THE INVENTION

The object of the present invention is to provide a simple and cheap method of forming grooves with acute-angled cutting edges in the sides of the teeth of a shaving cutter.

According to the invention, this object is achieved by a method which comprises, in order:

- a first machining step for the removal of shavings, in the course of which a plurality of grooves is formed, each groove having two side walls substantially perpendicular to a plane tangential to the respective side of the tooth, and
- a second machining step for the removal of shavings, in the course of which the side walls of each groove are machined to produce a cutting edge with an acute cutting angle on each side wall.

A further subject of the invention is a tool for forming grooves with cutting edges in accordance with the aforesaid method.

BRIEF DESCRIPTION OF THE DRAWINGS

Further characteristics and advantages of the present invention will become clear in the course of the detailed description which follows, given purely by way of non-limiting example, with reference to the appended drawings, in which:

FIGS. 3 and 4 are schematic sections showing a tooth during a preliminary stage and an advanced stage of the machining, FIGS. 5 and 6 are schematic sections taken on the lines V—V and VI—VI of FIGS. 3 and 4, FIG. 7 is a section similar to that of FIG. 6, showing the final stage of the machining, FIG. 8 is a detail taken on the arrow VIII of FIG. 7 on an enlarged scale, and FIGS. 9–13 are schematic, perspective views of a cutting element of the tool for forming the grooves in the shaving cutter.

DETAILED DESCRIPTION OF THE EMBODIMENT

Figure 1:
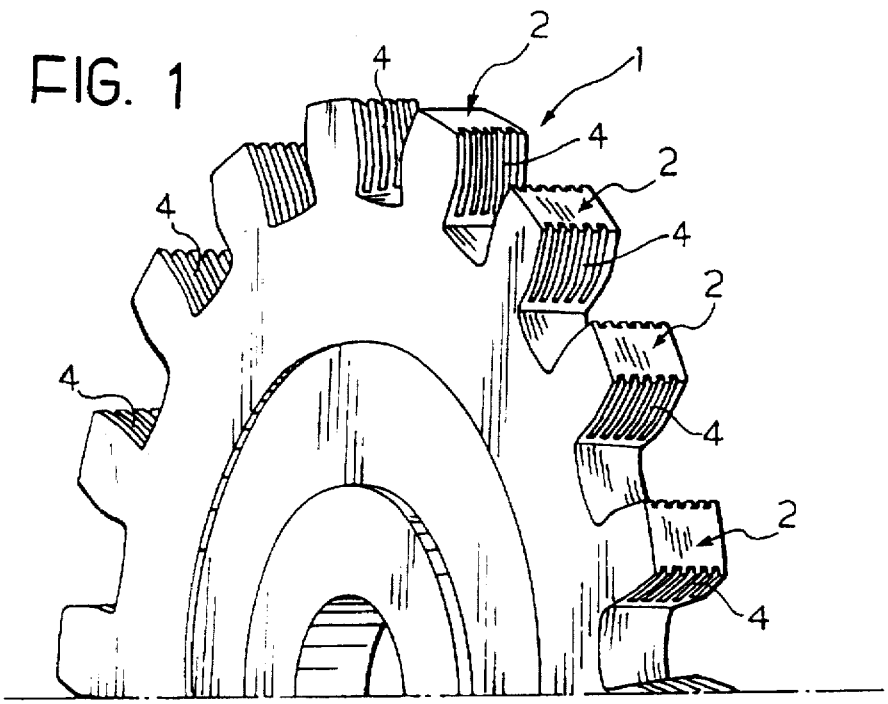
FIG. 1 is a partial perspective view of a shaving cutter produced by a method according to the invention.

With reference to FIG. 1, a shaving cutter, indicated 1, comprises a plurality of teeth 2, the sides 4 of which have involute profiles. FIG. 1 shows the particular case of a shaving cutter with straight teeth, but the method which will be described below applies equally to the manufacture of cutters with helical teeth and with conical teeth (that is, teeth in which the inclination of the helix of one side differs from the inclination of the helix of the other side).

The method and the tool according to the invention are also used for the manufacture of linear shaving cutters constituted by splined rods rather than toothed wheels as shown in FIG. 1.

Figure 2:
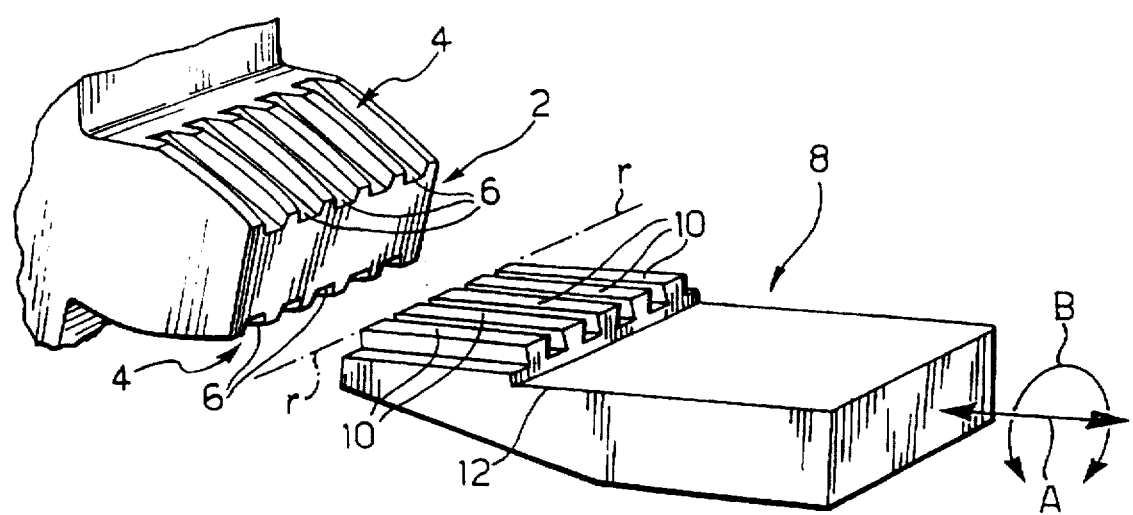
FIG. 2 is a perspective view showing a tooth of the shaving cutter beside the tool for forming the grooves in the sides of the tooth.

As can be seen in greater detail in FIG. 2, a plurality of grooves 6 is formed in the sides 4 of each tooth 2, the edges of the grooves 6 constituting the cutting edges which shave the sides of the teeth of a gear meshed with the shaver. The pressure necessary to remove the excess metal envisaged is achieved by moving the shaving cutter gradually towards the gear. The grooves 6 are produced by machining with the removal of shavings, by means of a slotting tool 8 having a plurality of cutting elements 10 which project from a support 12.

With reference to FIGS. 9–13, each cutting element 10 of the slotting tool 8 has a trapezoidal profile, the smaller base of which is situated adjacent the support 12 of the tool. The rake angles of the cutting edges of each element 10 may assume various configurations based upon different requirements.

In the case of FIG. 9, the cutting element has a rake angle only on the side faces 14, 16. In the case of FIG. 10, the cutting element has a rake angle on the side faces 14, 16 and on the frontal cutting surface 18 and in the case of FIG. 11, in addition to the previous rake angles, the cutting element has a further rake in the outer surface 20.

In FIG. 12, all the surfaces of the cutting element have rake angles and, finally, in the variant of FIG. 13, the cutting element 10 has rake angles in all of the surfaces but formed only partially.

The machining cycle starts with the positioning of the slotting tool 8 in a manner such that the plane constituted by the outer surfaces 20 of the cutting elements, or the straight line indicated r in FIG. 2, touches the surface of the side of the tooth in a predetermined region (FIG. 3).

A cutting motion and an advancing or penetrating motion are then imparted to the tool 8. In the particular case of teeth with straight sides, the cutting motion will be simply a straight-line motion directed approximately radially relative to the axis of the shaver 1 in the directions indicated by the double arrow A in FIG. 4. In the more general case in which the side of the tooth is helical, the slotting tool 8 will be given a helical cutting motion constituted by a straight-line advance combined with a rotary motion, as indicated schematically by the arrows A and B in FIG. 2.

The advancing or penetrating motion is directed perpendicular to a plane tangential to the side of the tooth 4 and is indicated by the arrows C in FIGS. 3 and 4. As can be seen in FIG. 6, a plurality of grooves with approximately rectangular profiles (FIG. 6) and having side walls 22, 24 which are perpendicular to the plane tangential to the side of the tooth at each point, is thus produced in the side of each tooth. The distance between the side walls 22, 24 is equal to the width of the larger base of the cutting element 10.

This first machining step ends when the desired depth of the grooves is reached. The advancing motion of the slotting tool 8 in depth in the direction C is then cancelled and—whilst the cutting motion in the direction A, or the helical motion given by the combination of movements A and B is maintained—an advancing motion directed parallel to a plane tangential to the side of the tooth is imparted to the tool. The direction of this second advancing motion is indicated by the arrow D in FIG. 7.

The side walls of the groove are thus machined, causing them to take on the inclined shape shown in FIG. 8 which provides the cutting edges 26 of the grooves with an acute cutting angle. The inclinations of the side walls of each groove may also differ from one another, as shown in FIGS. 7 and 8, by suitable shaping of the sides 14, 16 of the cutting element 10.

This system can also achieve better finishing of the sides of the grooves of the shaving cutter since—once the desired geometry is achieved—these sides can be polished a (suitably selected) number of times n with the same tool or with another tool made of abrasive material.

The advantages of the method according to the invention, in comparison with the electrical discharge machining method, consist of a considerable reduction in machining times, of the certainty of not creating microcracks and/or decarburation on the sides of the grooves, of the ease with which it is possible—where necessary—to give different rake angles to the two sides of the grooves, and of the fact that the sides of the grooves can easily be precision finished.

It is considered that advantages are also achieved in comparison with current shavers which have cutting edges with cutting angles of about 90°, since, by improving the cutting conditions, it is possible to reduce machining times by the use of faster speeds and by avoiding the reversal of the rotary motion of the tool.

Conversely, it is considered that, by improving the cutting conditions, greater productivity can be achieved for a given machining cycle.

Moreover, these shavers facilitate the shaving of gears which have lateral obstructions.

What is claimed is:

1. A method of forming grooves with cutting edges in the sides of the teeth of a shaving cutter, comprising, in order:
   a first machining step with the removal of shavings, in the course of which a plurality of grooves is formed, each groove having two side walls substantially perpendicular to a plane tangential to the respective side of the tooth,
   a second machining step with the removal of shavings, in the course of which the side walls of each groove are machined to produce, on each side wall, a cutting edge with an acute cutting angle, and
   wherein both of the steps for the machining of each groove are achieved by means of a single cutting element which has a trapezoidal profile in a plane perpendicular to the side of the tooth, with its larger base facing inwardly of the groove and its smaller base facing outwardly of the groove.

2. A method according to claim 1, wherein in order to carry out the first machining step, the cutting element is given an advancing motion perpendicular to a plane tangential to the side of the tooth and, in order to carry out the second machining step, the cutting element is given an advancing motion parallel to a plane tangential to the side of the tooth.

* * * * *